(12) United States Patent
Liu et al.

(10) Patent No.: US 9,981,338 B2
(45) Date of Patent: May 29, 2018

(54) HYBRID FRICTION STIR WELDING FOR DISSIMILAR MATERIALS THROUGH ELECTRO-PLASTIC EFFECT

(71) Applicant: THE REGENTS OF THE UNIVERSITY OF MICHIGAN, Ann Arbor, MI (US)

(72) Inventors: Xun Liu, Ann Arbor, MI (US); Shuhuai Lan, Ann Arbor, MI (US); Jun Ni, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 368 days.

(21) Appl. No.: 14/742,749

(22) Filed: Jun. 18, 2015

(65) Prior Publication Data

US 2015/0375335 A1 Dec. 31, 2015

Related U.S. Application Data

(60) Provisional application No. 62/017,286, filed on Jun. 26, 2014.

(51) Int. Cl.
*B23K 20/12* (2006.01)

(52) U.S. Cl.
CPC ........ *B23K 20/1245* (2013.01); *B23K 20/126* (2013.01)

(58) Field of Classification Search
CPC ......... B23K 20/12; B23K 31/02; B23K 37/00
USPC ............... 228/2.1, 2.3, 112.1; 219/78.13
See application file for complete search history.

(56) References Cited

U.S. PATENT DOCUMENTS

| | | | | |
|---|---|---|---|---|
| 5,829,664 | A * | 11/1998 | Spinella | B23K 20/1235 |
| | | | | 219/78.13 |
| 6,866,181 | B2 | 3/2005 | Aota et al. | |
| 7,156,277 | B2 | 1/2007 | Ishikawa et al. | |
| 8,164,021 | B1 * | 4/2012 | Ferrando | B23K 20/1255 |
| | | | | 219/78.13 |
| 2010/0159265 | A1 * | 6/2010 | Fairchild | B23K 9/0282 |
| | | | | 428/586 |

OTHER PUBLICATIONS

Matthew Pitschman et al., "Application of Electric Current in Friction Stir Welding", ASME Conf. Proc. 2010, 185 (2010).
(Continued)

*Primary Examiner* — Brian Jennison
(74) *Attorney, Agent, or Firm* — Harness, Dickey & Pierce, P.L.C.

(57) ABSTRACT

A hybrid Friction Stir Welding approach and device for dissimilar materials joining employing Electro-Plastic Effect. The approach and device include an introduction of high density, short period current pulses into traditional friction stir welding process, which therefore can generate a localized softened zone in the workpiece during plastic stirring without significant additional temperature increase. This material softened zone is created by high density current pulses based on Electro-Plastic Effect and will move along with the friction stir welding tool. Smaller downward force, larger processing window and better joint quality for dissimilar materials are expected to be achieved through this hybrid welding technique.

15 Claims, 4 Drawing Sheets

(56) References Cited

OTHER PUBLICATIONS

V. D. Polovinko et al., "Solid-State Welding of Metals with Application of High Density Current Pulses", Surface Engineering and Applied Electrochemistry, Aug. 2008, vol. 44, Issue 4, pp. 330-334.
A. F. Sprecher et al., "Overview No. 49: On the Mechanisms for the Electroplastic Effect in Metals", Acta Metallurgica, 1986, vol. 34, No. 7, pp. 1145-1162.
Carl D. Ross et al., "Manufacturing Aspects Relating to the Effects of Direct Current on the Tensile Properties of Metals", Journal of Engineering Materials and Technology, vol. 129, Apr. 2007, p. 342.

* cited by examiner

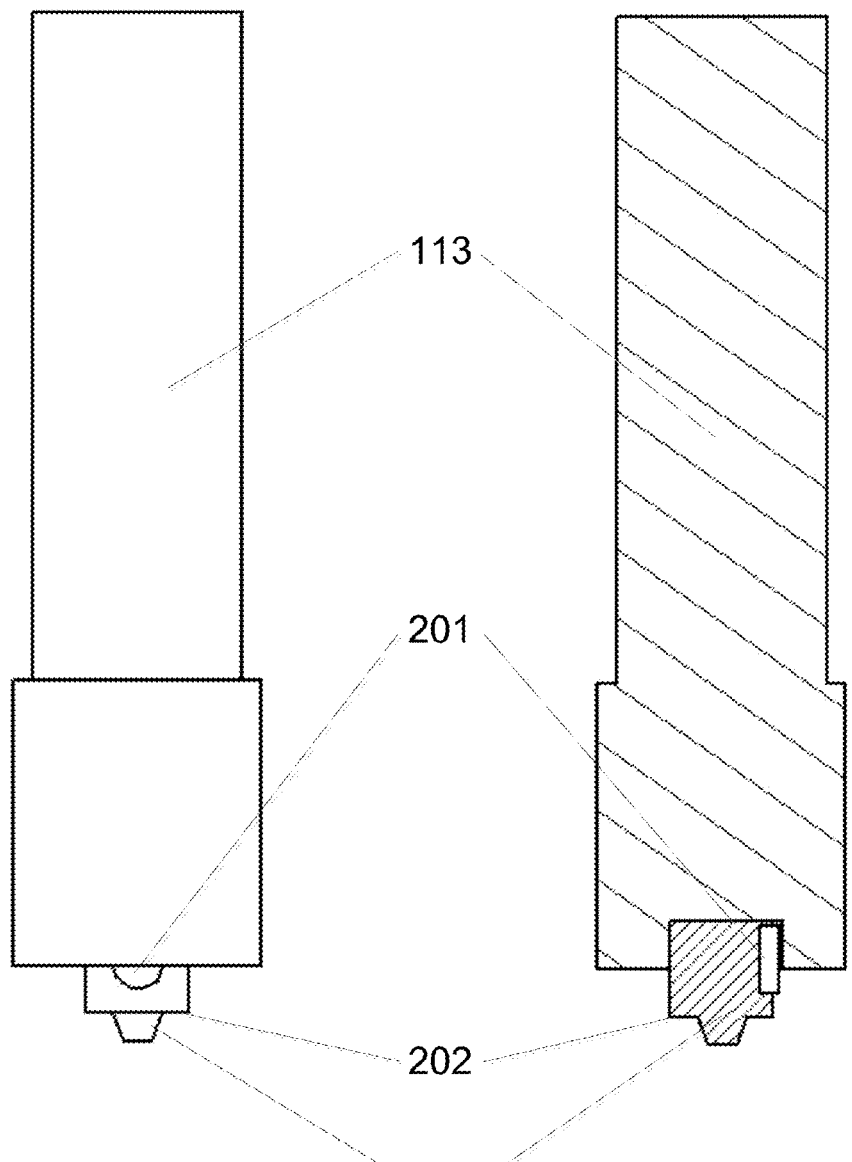
FIG. 2A  FIG. 2B
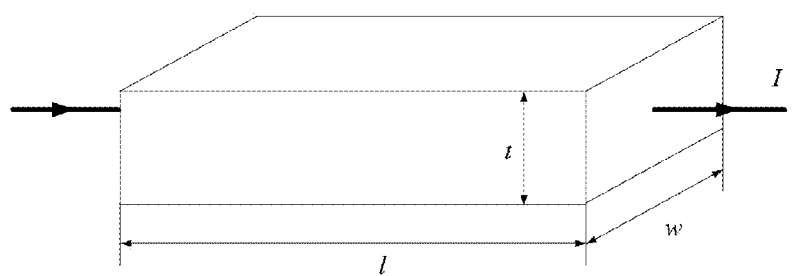
FIG. 3

HYBRID FRICTION STIR WELDING FOR DISSIMILAR MATERIALS THROUGH ELECTRO-PLASTIC EFFECT

CROSS-REFERENCE TO RELATED APPLICATIONS

This application claims the benefit of U.S. Provisional Application No. 62/017,286, filed on Jun. 26, 2014. The entire disclosure of the above application is incorporated herein by reference.

GOVERNMENT INTEREST

This invention was made with government support under DE-PI0000012 awarded by the Department of Energy. The Government has certain rights in the invention.

FIELD

The present disclosure relates to a hybrid Friction Stir Welding (FSW) approach and device for joining dissimilar materials employing Electro-Plastic Effect.

BACKGROUND AND SUMMARY

This section provides background information related to the present disclosure which is not necessarily prior art. This section provides a general summary of the disclosure, and is not a comprehensive disclosure of its full scope or all of its features.

Lightweight vehicles are receiving more and more attention due to the growing concern of energy consumption. Gradual application of lightweight materials into automobile structures increases the demand for dissimilar material joining. Friction Stir Welding (FSW) is preferable over traditional fusion welding in this field, which benefits from its solid state nature. In this process, a rotating tool, which consists a pin and a shoulder, is plunged into the workpiece till the shoulder touches the upper surface of the workpiece. Heat generated by friction and plastic deformation softens the material and the joint is finalized through the plasticized material flow and recrystallization induced by the mechanical motion of the tool.

However, friction stir welding dissimilar materials remain in the experimental stage despite its advantages. This is partially due to the small processing window for producing satisfying joints. Another related drawback is the high axial force when initiating the process and the consequent severe tool wear when welding high melting temperature materials with other relatively softer materials. Recent improvements on Friction Stir Welding paid emphasis on reducing the vertical plunge force basically through thermal softening effect. Considering this, various heating methods have been proposed, such as induction heating, laser heating and resistance heating. In U.S. Pat. No. 8,164,021, a localized resistance heating circuit with continuous AC or DC current connecting the tool and the workpiece is described and a 90% reduction of vertical force has been reported. However, since the tool is part of the whole circuit, it will also be undesirably heated and results in further tool wear. Besides, although additional heat sources can help soften the material, they will on the other hand introduce additional heat input and increase the size of heat affected zone, which therefore deteriorate the joint quality. This is especially true for dissimilar material welding process, during which the amount of brittle intermetallic compounds generated is directly related to the welding temperature and affects the consequent joint strength.

Electro-Plastic Effect, which describes the material softening phenomenon during plastic deformation, is induced by high density, short duration current pulses at a relatively low temperature. The softening effect depends on the type of materials and is reported to be more effective in certain types of hard material than in some soft materials. Accordingly, it is desired to incorporate this effect into friction stir welding process to preserve tool life, enlarge processing window and improve the joint efficiency of dissimilar materials.

In some embodiments, the invention is a hybrid friction stir welding device for preserving the tool life, enlarging processing window and improving joint quality of dissimilar materials through Electro-Plastic Effect. In this aspect, the device is compatible with existing friction stir welding equipment. According to this aspect, the device includes an insulated backing plate with a displaceable strip in the middle, a friction stir welding tool consisting of a tool shank, key and a displaceable tool head. The tool head is preferred to be made of insulation materials, but not necessary. In this aspect, the invention includes a circuit for creating a localized material softening zone surrounding the friction stir welding tool in the workpiece. This circuit consists of an electrical pulse current source, a fixture attached to the friction stir welding tool for connecting the electrodes, and a pair of conductive wheels for finally transporting the current into the workpiece. Workpieces are positioned parallel to each other and electrically connected in series. The fixture can be adjusted and the relative positions of the two wheels with respect to the tool can be correspondingly changed to achieve the best joint quality. In this aspect, the workpiece can alternatively be electrically connected in parallel or other conditions based on the layout of the two wheels. In this aspect, the conductive wheels can also be changed into conductive balls or brushes.

In some embodiments, the invention is a hybrid friction stir welding approach for preserving the tool life, enlarging processing window and improving joint quality of dissimilar materials through Electro-Plastic Effect. The approach includes providing a friction stir welding tool with an insulated pin and providing abutted parts of dissimilar materials. According to this approach, the faying surface of the two parts lies upon the displaceable strip of the insulated backing plate. The method further includes an independent electrical pulse circuit. In this circuit, the electrodes of the electrical pulse current source are connected to a fixture attached to the friction stir welding tool. A pair of conductive wheels, or alternatively conductive balls or brushes, are installed at the end of the fixture and pushed against the upper surface of the workpiece. According to this aspect, the friction stir welding tool is outside the circuit. The two workpieces are electrically connected in series and have equal amount of current flowing inside. Alternatively, the workpiece can be electrically connected in parallel and have equal amount of voltage applied inside. Alternatively, the relative positions of the two conductive wheels, balls or brushes can be varied to achieve the best joint quality. According to the approach, the material softening zone is restricted within the pair of conductive wheels, balls or brushes and moving along with the friction stir tool. The pulse parameters are adjusted to stimulate the materials softening effect while confining the temperature increase associated with resistive heating.

In some embodiments, the invention is an operational procedure for the hybrid friction stir welding method for preserving the tool life, enlarging processing window and improving joint quality of dissimilar materials through Electro-Plastic Effect. In this aspect, two workpieces are abutted together and clamped onto the insulation backing plate. The faying surface lies on the displaceable strip in the middle. The fixture is adjusted to a position where the conductive wheels, balls or brushes are pushed against the workpiece while a small amount of distance is maintained between the friction stir welding tool and the workpiece. The electrodes are then applied to the fixture. Then adjust the pulse parameters to a desired value and turn on the electrical energy power. Next step is to start rotating the friction stir welding tool and insert the tool into the workpiece till the shoulder touches the upper surface. The tool is then moved along the joint line with the wheels, balls or brushes sliding on the surface conveying the current pulses into the workpiece. Finally, the friction stir welding tool is extracted from the workpiece and the electrical power source is switched off.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2A is a front view of the profile of the friction stir welding tool used for this electrically assisted Friction Stir Welding process.

FIG. 2B is a cross sectional profile view of the tool shown in FIG. 2A.

FIG. 3 is a schematic diagram for explanation of the calculation of temperature increase generated through resistive heating.

Corresponding reference numerals indicate corresponding parts throughout the several views of the drawings.

DETAILED DESCRIPTION

Figure 1A:
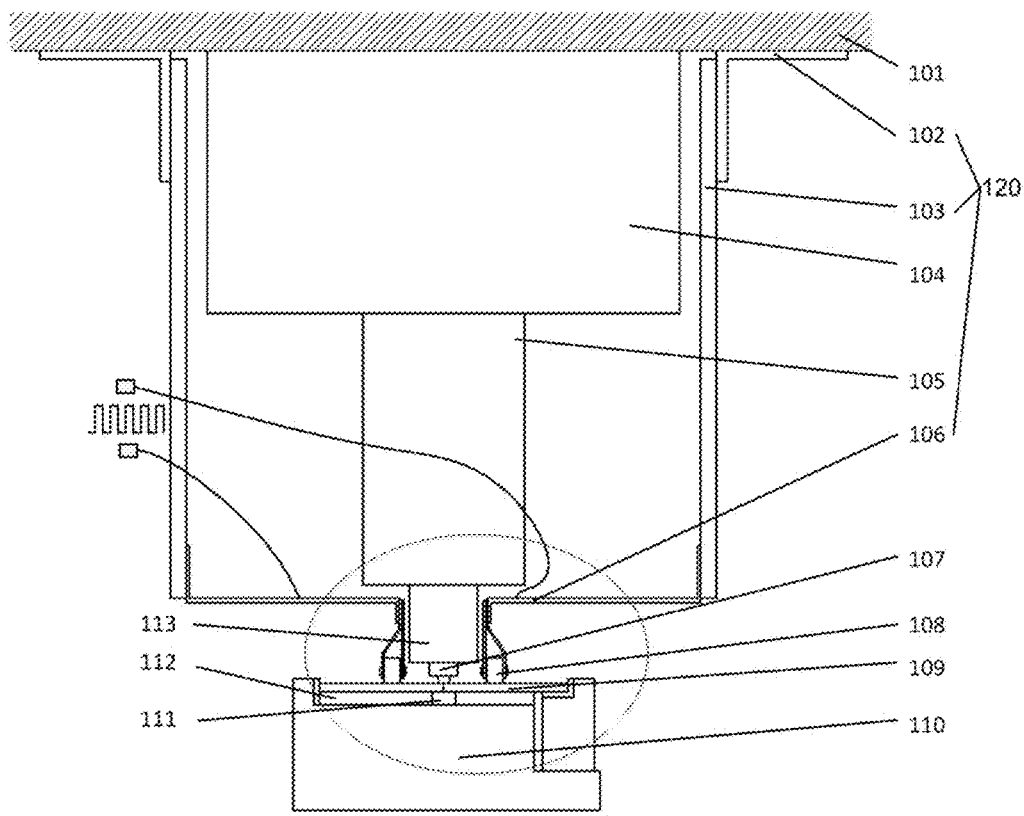
FIG. 1A is a schematic illustration of the device for the hybrid Friction Stir Welding through Electro-Plastic Effect according to an embodiment of the invention, where the workpieces are electrically connected in series.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1B:
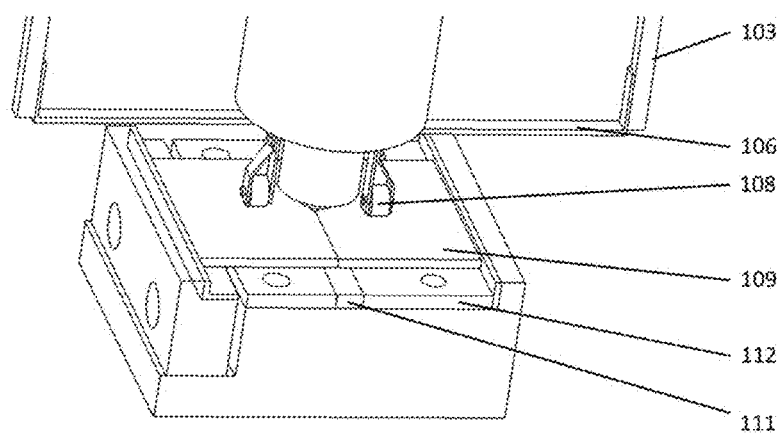
FIG. 1B is a partially magnified view of the circled region of FIG. 1A.
Figure 1C:
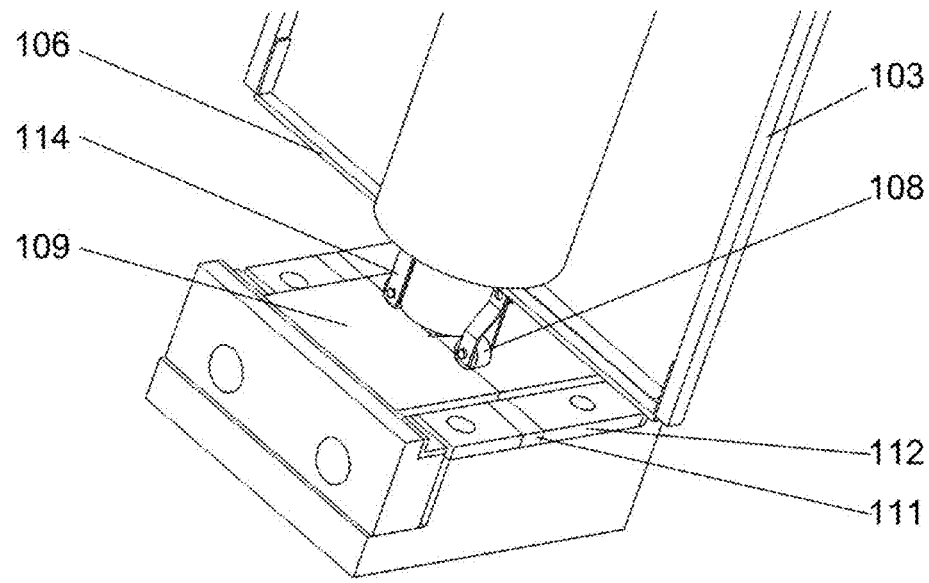
FIG. 1C is a partially magnified view of the circled region of FIG. 1A, where the device is modified such that the workpieces are electrically connected in parallel.
Figure 1D:
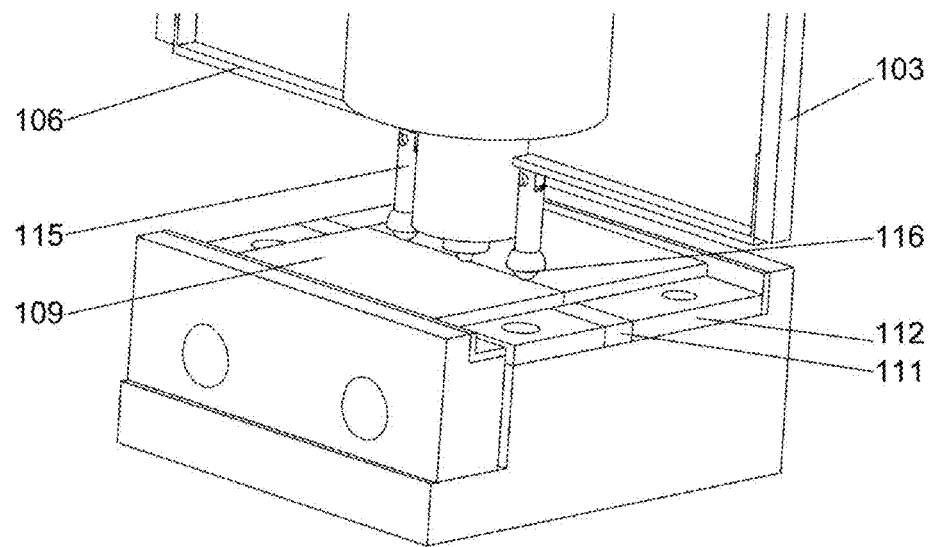
FIG. 1D is a partially magnified view of the circled region of FIG. 1A, where the device is modified and the conductive wheels are replaced with conductive balls.

Referring first to FIG. 1A and FIG. 1B, which is a detailed illustration of the apparatus for the hybrid Friction Stir Welding through Electro-Plastic Effect. The apparatus includes a machine tool 101, which fulfills the rotational, downward and traverse motion of the friction stir welding tool relative to the workpiece. The machine tool can be any machine that has three degrees of freedom in the above-mentioned directions, for example, traditional milling machines or machines designed specifically for friction stir welding. In other words, the invention is compatible with the existing equipment for friction stir welding. The machine tool contains a traverse moving part 104 with the spindle 105 installed inside. The friction stir welding tool, which consists of a tool shank 113, a key 201 and the displaceable tool head 107 as shown in FIG. 2A and FIG. 2B, is installed within the spindle 105 to obtain a desirable rotational speed. The apparatus 120 for introducing current includes 102, 103 and 106. The brackets 103 will be made of insulated materials to protect the machine tool 101 from the electrical energy. The brackets 106 are conductive and the electrodes of the pulse current source will be clamped onto them. No matter the relative traverse movement between the tool and the workpiece is achieved through the motion of the tool or motion of the workpiece, the apparatus 120 is attached to the friction stir welding tool. In other words, the apparatus 120 stays stationary with respect to the tool. At the terminals of the apparatus 120, a pair of conductive wheels 108 will be assembled to the brackets 106 for the final transport of current into the workpiece 109, whose materials are different on the two sides. The workpiece 109 lies on an insulated backing plate 112 with a displaceable insulated strip 111 in the middle. This design is to protect the whole fixture 110, where the workpieces are supported, from being welded together with the workpiece 109. In order for the firm contact between the conductive wheels and the workpiece, the length of the brackets 103 can be adjusted so that when the friction stir welding tool 107 touches the upper surface of the workpiece, the brackets 106 will be upswept and therefore serves with the function of cantilever spring. Alternatively, compressive springs can be added between 106 and 103 for guaranteeing the electrical contact. Besides, in order to accommodate different current requirements for dissimilar materials, the length of the brackets 106 can be adjusted so that relative positions of the tool and the two wheels can be changed and the tool is not necessarily positioned in the middle of the two wheels. The waveform of the input current is shown in FIG. 1A and the pulse parameters will be decided by the amount of the allowed temperature increase and the degree of the material softening effect. There are no requirements for the polarity of the electrodes. In FIG. 1B, the pairs of the conductive wheels 108 are arranged perpendicular to the welding direction. Accordingly the two workpieces are connected in series and subjected to electrical pulses of the same current density. Alternatively as shown in FIG. 1C, the pair of conductive wheels 108 can be arranged parallel to the welding direction with a change of brackets 114. In this case, the workpieces are electrically connected in parallel and subjected to electrical pulses of the same voltage. However, the layout of the two conductive wheels is not restricted to these two configurations. The relative positions of the two wheels can be adjusted and optimized based on the pair of materials to be welded. Furthermore, as shown in FIG. 1D, the conductive wheels 108 in FIG. 1B and FIG. 1C can be replaced with conductive balls 116 and the corresponding brackets 115. In this case, when the direction of the pair of balls is adjusted with respect to the welding direction, the brackets that connect 103 to the balls need not to be modified. Furthermore, the conductive wheels or balls can also be replaced with conductive brushes.

Referring secondly to FIG. 2, which is a schematic illustration of the friction stir welding tool developed in this invention. The tool consists of three parts, the tool head 107, the tool shank 113 and the key 201. The key 201 enables the rotation and toque transmission from the tool shank 109 to the tool head 107. The tool head is preferred to be made of electrically insulated materials, but not necessary. The tool head material should also possess the mechanical properties of high hardness and wear resistance under elevated temperature conditions. Example tool materials include PCBN (Polycrystalline Cubic Boron Nitride), $Si_3N_4$ and so on. The pin of the tool can have different shapes of cones, cylinders or with cross sectional profiles of other convex polygons. The outer surface of the pin can be threaded and the shoulder surface 202 can be concave with concentric grooves according to the specific requirements under different conditions.

The calculation of the temperature increase due to the current is demonstrated schematically in FIG. 3, where I is the value of the input current, t, w, l are dimensions of the workpiece. Denote $\rho_c$ as the current density, namely $$\rho_c = \frac{I}{t*w}$$

Denote $\rho_m$ as the material mass density, c as the specific heat capacity, $\rho_r$ as the electrical resistivity, R as the resistance of the component, m as the mass of the component, and $\tau$ is the time duration of the current. We can therefore approximately calculate the temperature increase $\Delta T$ based on the following equation according to the principle of resistive heating:

$$\Delta T = \frac{I^2 R}{mc}\tau = \frac{(\rho_c tw)^2 \rho_r \frac{l}{tw}}{\rho_m twlc}\tau = \frac{\rho_c^2 \rho_r}{\rho_m c}\tau$$

It is observed in this equation that the temperature increase due to resistive heating is not affected by the dimensions of the workpiece. It is only determined by material properties, current density, and the duration of the current pulses. In order for an effective Electro-Plastic Effect, the current density $\rho_c$ must reach a threshold value $\rho_{cTH}$. Considering from the aspect of joint quality, the additional temperature increase should be less than a critical value $\Delta T_c$. In sum, the selection criteria for pulse parameters are described as follows:

$$\begin{cases} \rho_c > \rho_{cTH} \\ \Delta T = \frac{\rho_c^2 \rho_r}{\rho_m c}\tau < \Delta T_c \end{cases}$$

Figure 4:
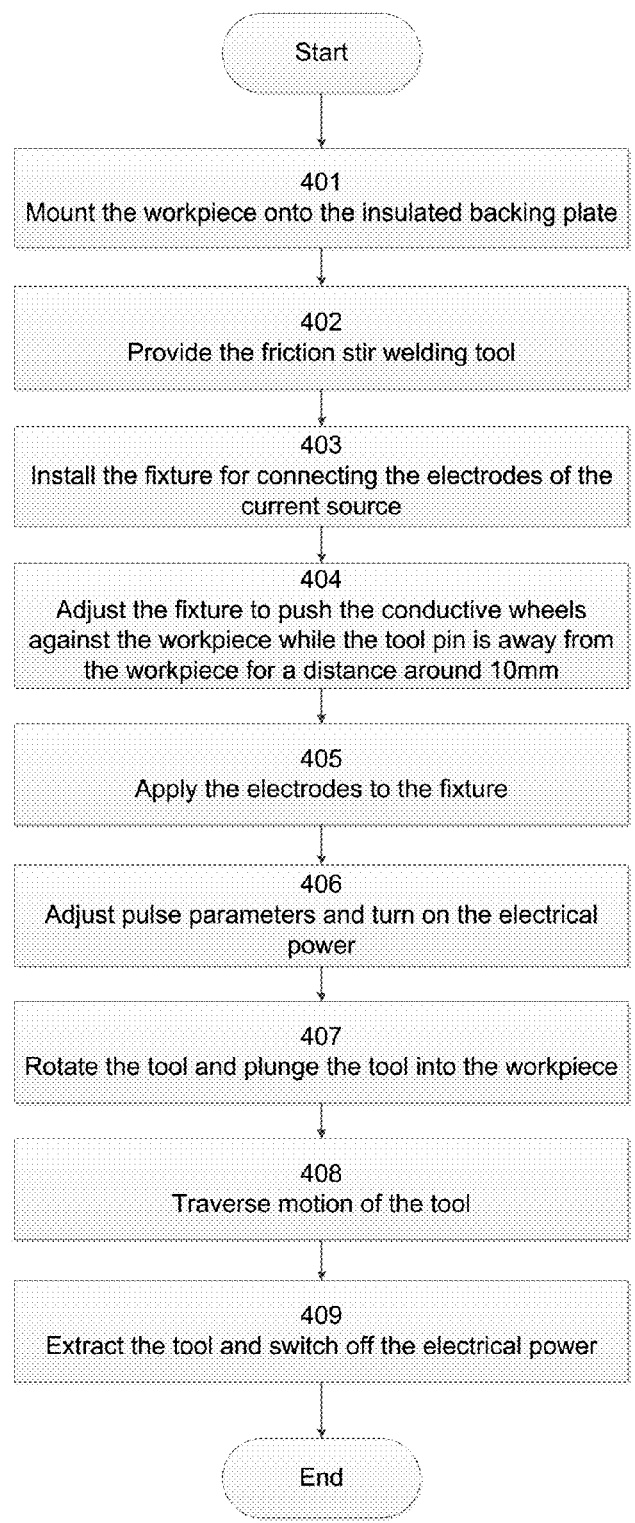
FIG. 4 is a detailed flowchart of the operational procedure for the electrically assisted Friction Stir Welding according to an embodiment of the invention.

FIG. 4 is a detailed flowchart of the standard operation procedure for the electrically assisted Friction Stir Welding through Electro-Plastic Effect according to an embodiment of the invention. Step 401 includes mounting the workpiece tightly onto the insulated backing plate. The faying surface of the two parts should lie upon the displaceable strip in the backing plate. In step 402, the friction stir welding tool, which is manufactured according to FIG. 2A and FIG. 2B of this invention, is assembled and installed into the machine 101 in FIG. 1. In step 403, the fixture 120 in FIG. 1 for connecting the electrodes of the pulse current source is installed to the machine 101. In step 404, the length of the brackets 103 is adjusted to result in the firm contact between the conductive wheels 108 and the upper surface of the workpiece 109. On the other hand, the distance between the friction stir tool pin and the workpiece is desired to be around 10 mm. Moreover, the relative position between the pair of wheels, balls or brushes and the friction stir welding tool is also adjusted considering the types of materials on the two sides of the joint line. In step 405, the electrodes of the electrical power source are clamped to the fixture 120. In step 406, the pulse parameters including pulse duration, current density and pulse period are decided and adjusted, followed by turning on the pulse current. In step 407, the friction stir welding tool starts to rotate and move downward until the shoulder reaches a desired plunge depth for the best joint quality. In step 408, the traverse motion of the tool is performed to complete the entire joint line. In the final step 409, the friction stir tool is extracted from the workpiece and the electrical power source is switched off.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hybrid friction stir welding device for use with a workpiece, the welding device comprising:
   a friction stir welding tool having a tool shank, a displaceable tool head, and a key operably coupled between the tool shank and the tool head for rotation and torque transmission from the tool shank to the tool head;
   an insulated backing plate for fixing and supporting the workpiece;
   a pulse current source having electrodes;
   a fixture attaching the electrodes of the pulse current source to the friction stir welding tool;
   at least a pair of conductive members electrically engaging the workpiece; and
   at least a pair of conductive brackets individually electrically coupling the electrodes with the pair of conductive members, each of the pair of conductive brackets further serving as a cantilever spring for firm contact between each of the pair of conductive members and the workpiece.

2. The welding device according to claim 1 wherein the fixture further comprises insulation brackets supporting each of the pair of conductive brackets, a length of the insulation brackets being adjusted to achieve a desired configuration of the friction stir welding tool, conductive members, and the workpiece.

3. The welding device according to claim 1 wherein the position of the conductive members can be adjusted to electrically connect the workpiece in series.

4. The welding device according to claim 1 wherein the position of the conductive members can be adjusted to electrically connect the workpiece in parallel.

5. The welding device according to claim 1 wherein the at least a pair of conductive member comprises at least one conductive wheel.

6. The welding device according to claim 1 wherein the at least a pair of conductive member comprises at least one conductive ball.

7. The welding device according to claim 1 wherein the at least a pair of conductive member comprises at least one conductive brush.

8. The welding device according to claim 1 wherein the at least a pair of conductive member are disposed in fixed relation with the friction still welding tool to maintain a localized electrical circuit adjacent thereto irrespective of movement of the workpiece.

9. The welding device according to claim 1 further comprising:
   a biasing member biasing the at least a pair of conductive members into engagement with the workpiece.

10. The welding device according to claim 1 wherein the insulated backing plate comprises an insulated strip disposed there along generally aligned with a welding path along the workpiece.

11. The welding device according to claim 1 wherein the friction stir welding tool outputs an electrical pulse according to a pulse criteria, the pulse selection criteria for appropriately determining the pulse parameters to both induce the Electro-Plastic Effect and restrict the temperature increase, which is shown as the following:

$$\begin{cases} \rho_c > \rho_{cTH} \\ \Delta T = \dfrac{\rho_c^2 \rho_r}{\rho_m c}\tau < \Delta T_c \end{cases}$$

where $\rho_c$ is the current density, $\rho_m$ is the material mass density, c is the material specific heat capacity, $\rho_r$ is the material electrical resistivity, $\rho_{cTH}$ is a threshold value for inducing the Electro-Plastic Effect and $\Delta T_c$ is a critical value for temperature increase.

12. The welding device according to claim 1 wherein the displaceable tool head is made of an electrically insulated material.

13. The welding device according to claim 1 wherein the displaceable tool head is made of Polycrystalline Cubic Boron Nitride (PCBN) or $Si_3N_4$.

14. The welding device according to claim 1 wherein the displaceable tool head is cone shaped.

15. The welding device according to claim 1 wherein the displaceable tool head is cylindrically shaped.

* * * * *